US012175531B2

United States Patent
Ohanissian

(10) Patent No.: US 12,175,531 B2
(45) Date of Patent: Dec. 24, 2024

(54) SYSTEMS AND METHODS FOR DYNAMIC DISPLAYS OF CURRENCY POOLING

(71) Applicant: Andre Ohanissian, Greenwich, CT (US)

(72) Inventor: Andre Ohanissian, Greenwich, CT (US)

(73) Assignee: AGO Advisors, LLC, Old Greenwich, CT (US)

( * ) Notice: Subject to any disclaimer, the term of this patent is extended or adjusted under 35 U.S.C. 154(b) by 107 days.

(21) Appl. No.: 17/515,346

(22) Filed: Oct. 29, 2021

(65) Prior Publication Data

US 2022/0051335 A1     Feb. 17, 2022

Related U.S. Application Data

(63) Continuation of application No. 16/028,115, filed on Jul. 5, 2018, now abandoned.

(60) Provisional application No. 62/529,467, filed on Jul. 6, 2017.

(51) Int. Cl.
    *G06Q 40/04*       (2012.01)
    *G06Q 40/02*       (2023.01)
    *H04L 9/40*        (2022.01)

(52) U.S. Cl.
    CPC ............. *G06Q 40/04* (2013.01); *G06Q 40/02* (2013.01); *H04L 63/0428* (2013.01)

(58) Field of Classification Search
None
See application file for complete search history.

(56) References Cited

U.S. PATENT DOCUMENTS

2005/0283422 A1* 12/2005 Myr .................... G06Q 30/08
                                                                                            705/37
2010/0287087 A1* 11/2010 Bartko .................. G06Q 40/04
                                                                                            705/37

OTHER PUBLICATIONS http://www.fxall.com/images/xcurrencynetting_product_image.jpg—May 26, 2010, available at https://web.archive.org/web/20100526043118/http://www.fxall.com/images/xcurrencynetting_product_image.jpg.
https://www.360t.com/wp-content/uploads/2015/03/Screenshot-BRIDGE.jpg—Jun. 24, 2018, available at https://web.archive.org/web/20180624115219/https:www.360t.com/wp-content/uploads/2015/03/Screenshot-BRIDGE.jpg.
Introduction to Bloomberg FX Functions—Feb. 19, 2016, available at https://lippincottlibrary.wordpress.com/2016/02/19/fx-functions/.
Bloomberg: Taking the lead in shaping the client e-FX trading experience—Nov. 9, 2021, available at https://www.bloomberg.com/professional/blog/bloomberg-taking-the-lead-in-shaping-the-client-e-fx-trading-experience/available at https://web.archive.org/web/20220324105901/https:www.bloomberg.com/professional/blog/bloomberg-taking-the-lead-in-shaping-the-client-e-fx-trading-experience/.
Bloomberg FXGO adds Supplementary Cost Analysis Tool—available at https://liquidityfinder.com/news/bloomberg-fxgo-adds-supplementary-cost-analysis-tool.
FXGO Exceed Expectations.

* cited by examiner

*Primary Examiner* — Scott S Trotter
*Assistant Examiner* — Amit Patel

(57) ABSTRACT

The present disclosure relates to novel methods and systems for dynamically displaying currency trading activities.

3 Claims, 5 Drawing Sheets

200

A method including the functional aspect as recited in the following steps

↓ 205 receiving, at a first computerized exchange in a network with at least one electronic currency source and a plurality of client devices, data and instructions from one of the plurality of client devices and to filter the data and instructions using metadata or data patterns to identify:

(i) performance data including one or more of an average currency balance, average interest-rate, average spread, and total interest rate;

(ii) client data corresponding to bank access information for an electronic bank account and to currency value corresponding to the electronic bank account; and (iii) an instruction to execute opportunistic-type trades or combination-type trades using the currency value; and

↓ 210 causing, by execution of one or more of the plurality of computer-readable code stored in a storage medium of the first computerized exchange, sub-functions of Fig. 3;

SYSTEMS AND METHODS FOR DYNAMIC DISPLAYS OF CURRENCY POOLING

RELATED APPLICATIONS

This application is a continuation of, and claims the benefit of, U.S. application Ser. No. 16/028,115, filed Jul. 5, 2018, and entitled SYSTEMS AND METHODS FOR DYNAMIC CURRENCY POOLING INTERFACES, which claims the benefit of U.S. Prov. Appl. No. 62/529,467, filed Jul. 6, 2017. U.S. application Ser. No. 16/028,115 is hereby incorporated herein by reference.

TECHNICAL FIELD

The present disclosure generally relates to efficient allocation of currency balances in a dynamic currency trading environment.

BACKGROUND

One or more computers in a computerized trading network are only capable of receiving and transmitting data in accordance with its designation in a network. The one or more computers are typically limited in their capabilities by integration issues with entities outside the computerized trading network. Moreover, the use of secure architecture in such a computerized trading network restricts information flow and the efficient allocation of currency balances for currency trading.

A particular inefficiency in a typical computing system is the inability of a processor and memory alone to recognize issues and contexts in monetary exchanges, and subsequently, its inability to communicate currency transfers to benefit from the issues and contexts. For example, in many implementations, the one or more computers are low level client devices that merely serve to receive input from a user and transmit data corresponding to that input. Recognition of issues involving currency levels or interfacing with other devices to allocate currency balances is not typically understood in a limited hardware environment. Such issues do not exist in regular money transactions because the context is provided by user recognition of the issues, but user recognition is further challenged by information asymmetry because a user is not typically privy to the present state of currency valuation in different countries. Moreover, the efficient allocation of currency resources cannot merely replicate exchanging physical currency because denominations, rates, reference currency values, and interest rates are constantly changing.

The particular inefficiency for the typical computing system described herein is not a business practice implementation, but is a particular issue with present computers that do not have the capability to recognize dynamic changes in currency values. The present inefficiency is entrenched in computer and network technology, because the prevalent use of computers, personal digital assistants, smartphones, netbooks, ultra books, laptops, and other connected smart devices, increases information asymmetry by increasing the flow of excessive and unfiltered data to a user. A typical computing system is unable to derive context from dynamic data by hardware alone and no present implementation would allow efficient recognition of dynamic changes to currency levels and their allocation in monetary exchanges with proper context.

SUMMARY

Aspects of the present invention may resolve particular inefficiencies in typical computer systems that implement monetary exchanges without issue recognition and context. Pertinently, the present disclosure describes (a) improvement to computing systems via new instructions and rules, implemented using software and/or firmware, that enable efficient communications based on currency levels with other computers in a computerized trading network; (b) filtering data and instructions to identify performance and client data, and instructions for trading, thereby resolving context and the recognition of key issues; and (c) new analysis processes for computing systems for checking currency balances for allocation in opportunistic-type or combination-type trades.

In an exemplary implementation, a system including a first computerized exchange in a network with at least one electronic currency source and a plurality of client devices is provided. A storage medium of the first computerized exchange is provided for storing a plurality of computer-readable code and one or more processors for executing one or more of the plurality of computer-readable code, which further configures the one or more processors to perform the functions herein. The one or more processors executing the one or more of the plurality of computer-readable code functions causes the first computerized exchange to receive data and instructions from one of the plurality of client devices and to filter the data and instructions using metadata or data patterns to identify performance data, client data, and/or an instruction. The performance data includes one or more of an average currency balance, average interest-rate, average spread, and total interest rate. The client data corresponds to bank access information for an electronic bank account and to currency value corresponding to the electronic bank account. The instruction is, for example, to execute opportunistic-type trades or combination-type trades using the currency value. Furthermore, the one or more processors executing the one or more of the plurality of computer-readable code functions causes the first computerized exchange to communicate with at least one electronic currency source using the bank access information to secure the currency value for use in the opportunistic-type trades or combination-type trades and to execute the opportunistic-type or combination-type trades in accordance with the received instruction. The opportunistic-type or combination-type trades use part or all of the currency value to iteratively secure currency positions from one or more second computerized exchanges in the network. Each of the iteratively secured currency positions is verified as a positive variation of one or more of the performance data. The one or more processors executing the one or more of the plurality of computer-readable code functions also causes the first computerized exchange to update the currency value after the opportunistic-type or combination-type trades are executed and to transmit for display to one of the plurality of client devices the updated currency value and a projected gain value calculated from the positive variation of each of the iteratively secured currency positions.

In another exemplary implementation, a method including a first computerized exchange in a network with at least one electronic currency source and a plurality of client devices is provided. A storage medium of the first computerized exchange is provided for storing a plurality of computer-readable code and one or more processors for executing one or more of the plurality of computer-readable code, which further configures the one or more processors to perform the functions herein. The one or more processors executing the one or more of the plurality of computer-readable code functions causes the first computerized exchange to receive data and instructions from one of the plurality of client devices and to filter the data and instructions using metadata or data patterns to identify performance data, client data and an instruction. The performance data includes one or more of an average currency balance, average interest-rate, average spread, and total interest rate. The client data corresponds to bank access information for an electronic bank account and to currency value corresponding to the electronic bank account. The instruction is to execute opportunistic-type trades or combination-type trades using the currency value. Furthermore, the one or more processors executing the one or more of the plurality of computer-readable code functions causes the first computerized exchange to communicate with the at least one electronic currency source using the bank access information to secure the currency value for use in the opportunistic-type trades or combination-type trades and to execute the opportunistic-type or combination-type trades in accordance with the received instruction. The opportunistic-type or combination-type trades use part or all of the currency value to iteratively secure currency positions from one or more second computerized exchanges in the network. Each of the iteratively secured currency positions is verified as a positive variation of one or more of the performance data. The one or more processors executing the one or more of the plurality of computer-readable code functions also causes the first computerized exchange to update the currency value after the opportunistic-type or combination-type trades are executed and to transmit for display to one of the plurality of client devices the updated currency value and a projected gain value calculated from the positive variation of each of the iteratively secured currency positions.

In another embodiment, a system connectable with a plurality of client devices and with at least one electronic currency source, includes a storage medium for storing a plurality of computer-readable code and at least one processor for executing one or more of the plurality of computer-readable code to receive data and instructions from one of the plurality of client devices and to filter the data and instructions using at least one of metadata or data patterns to identify, performance data including one or more of an average currency balance, average interest-rate, average spread, and total interest rate, client data corresponding to bank access information for an electronic bank account and to currency value corresponding to the electronic bank account; and an instruction to execute at least one of opportunistic-type trades or combination-type trades using the currency value, communicate with the at least one electronic currency source using the bank access information to secure the currency value for use in the opportunistic-type trades or combination-type trades, execute the opportunistic-type or combination-type trades in accordance with the received instruction, wherein the opportunistic-type or combination-type trades use part or all of the currency value to iteratively secure currency positions from one or more second computerized exchanges in the network, and wherein each of the iteratively secured currency positions is verified as a positive variation of one or more of the performance data and update the currency value after the opportunistic-type or combination-type trades are executed and to transmit for display to one of the plurality of client devices the updated currency value and a projected gain value calculated from the positive variation of each of the iteratively secured currency positions.

BRIEF DESCRIPTION OF THE DRAWINGS

The accompanying drawings constitute a part of this specification and, together with the written description herein, illustrate certain exemplary implementations of the invention.

FIG. 2 illustrates a flowchart of an exemplary method for a computerized exchange in a network with electronic currency sources and client devices.

FIG. 4 illustrates an exemplary interface, using the methods of FIGS. 2 and 3, for currency pool trading in a computerized exchange system, such as the system of FIG. 1.

FIG. 5 illustrates another exemplary interface using an API for currency pool trading on a computerized exchange system, such as the system of FIG. 1.

DETAILED DESCRIPTION

Systems and methods in accordance with various embodiments of the present disclosure may overcome one or more of the aforementioned and other deficiencies experienced in conventional approaches where computing systems regard monetary exchanges without issue recognition and context. Embodiments herein provide (a) improvement to computing systems via new instructions and rules, implemented using software and/or firmware, that enable efficient communications based on currency levels with other computers in a computerized trading network; (b) filtering of data and instructions to identify performance and client data, and instructions for trading, thereby resolving certain context and recognition of issues; and (c) new analysis processes for the computing systems for checking currency balances for allocation in opportunistic-type or combination-type trades.

Various other functions and advantages are described and suggested below as may be provided in accordance with the various embodiments.

Figure 1:
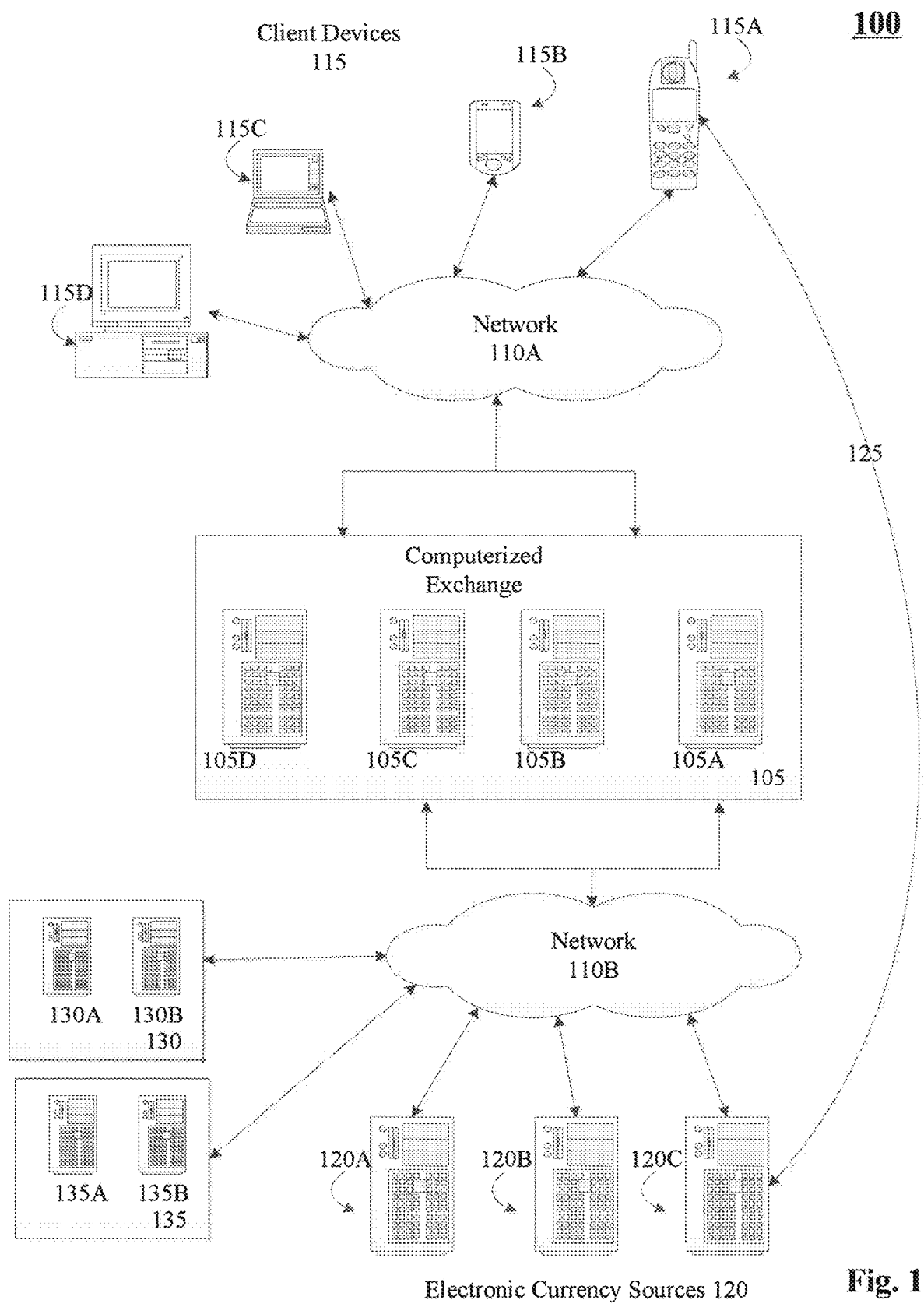
FIG. 1 illustrates an exemplary system of a computerized exchange in a network with electronic currency sources and client devices.

FIG. 1 illustrates an exemplary system 100 of a computerized exchange in a network with electronic currency sources and client devices, in accordance with various embodiments. The system 100 includes a computerized exchange 105 connected to client devices 115 and to electronic currency sources 120 via one or more networks 110. The client devices 115 include one or more smartphones and cellular devices 115A; one or more personal digital assistants 115; one or more laptops, netbooks, tablets, and other mobile computing devices 115C; and one or more desktops and other fixed computing devices 115D. The computerized exchange 105 includes one or more servers, illustrated in FIG. 1 as servers 105A, 105B, 105C and 105D. The servers may be configured to work together via an internal network structure or may function in a hierarchical structure as a presentation server, a database server, an applications server, or other related servers that are together configured to provide the present embodiments. Further, FIG. 1 illustrates additional computerized exchanges 130 and 135 that network with the computerized exchange 105 to trade currency positions.

Figure 3:
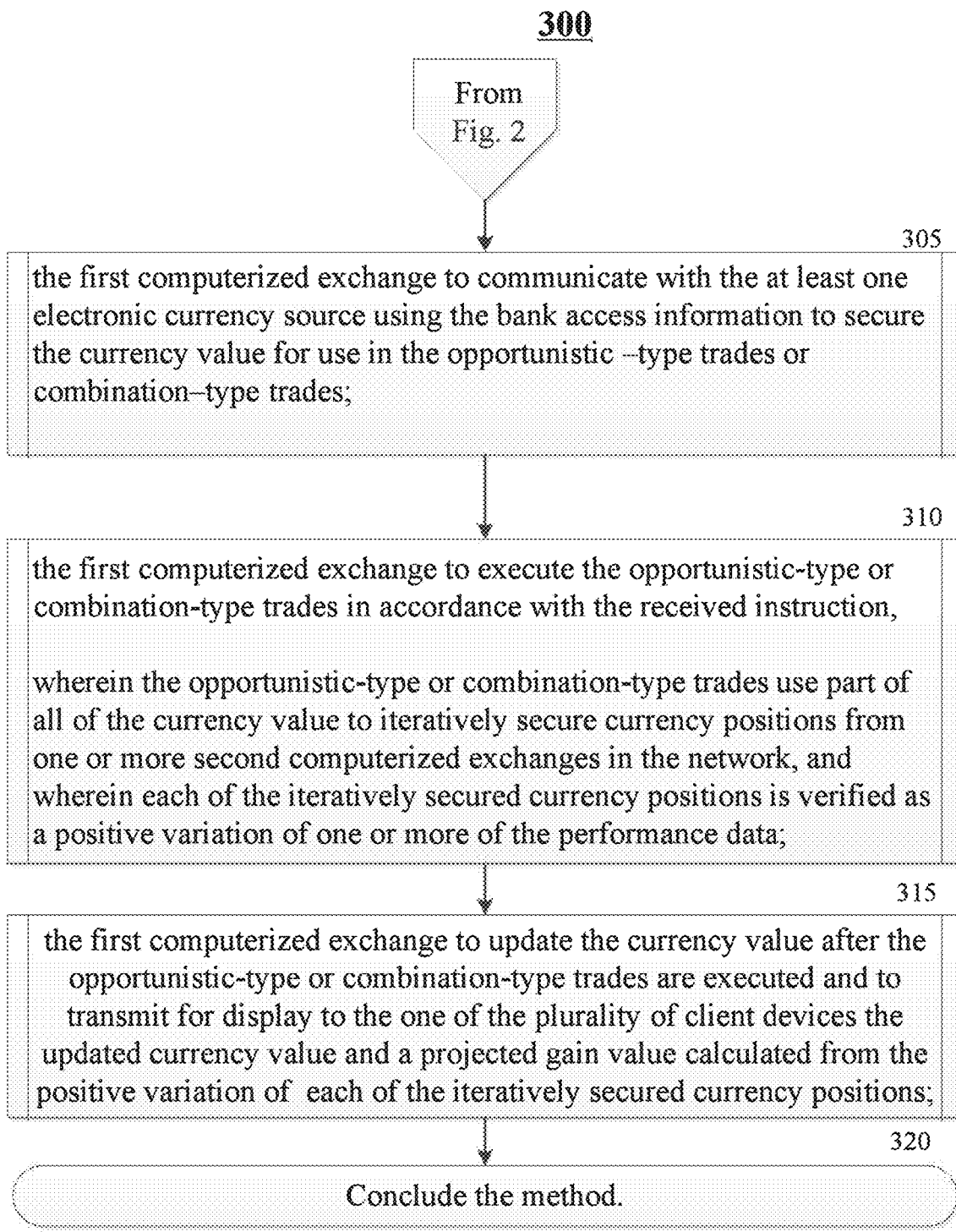
FIG. 3 illustrates a flowchart of an exemplary method for a computerized exchange in a network with electronic currency sources and client devices.

The one or more servers 105A-D forming the computerized exchange 105 include storage media that are either independent (e.g., as part of a database) or shared (e.g., as part of each server 105A-D), and are configured for storing a plurality of computer-readable code, such as code corresponding to the functions of FIGS. 2 and 3. The one or more servers 105A-D forming the computerized exchange 105 also includes one or more processors for executing one or more of the plurality of computer-readable code, which further configures the one or more processors to perform the functions herein.

The one or more processors in the computerized exchange 105 executing the one or more of the plurality of computer-readable code functions causes the computerized exchange 105 to receive data and instructions via network 110A from one of the client devices 115A-D. The computer-readable code functions cause the computerized exchange 105 to also filter the data and instructions using metadata or data patterns to identify performance data, client data and an instruction. In one example, streaming data from one or more resource sites—e.g., Bloomberg®, Reuters®, and other market-data sources, are available to filter. Pertinently, patterns from the data stream or metadata are available to filter and identify the performance data, client data, and instructions. In an exemplary embodiment, metadata signatures attached to the data packets or data stream form the basis for filtering of the data from multiple resources, thereby reducing data asymmetry.

The performance data includes one or more of an average currency balance, average interest-rate, average spread, and total interest rate. Such data may be historic data or tracked to real events, and applicable to present data streams for value approximation. In certain embodiments, user valuation of historical data, approximate or accurate, are available in the aforementioned data streams, from which the filter methods disclosed herein are available to filter the data. In another example, the performance data is specific to a request for data within a predetermined time period and the performance data is received with other unrelated data that is filtered using the present filter.

The client data corresponds to bank information for a corresponding electronic bank account and to a currency value corresponding to the electronic bank account. In an example, bank information pertains to currency values, currency type, and availability, from one or more electronic currency sources 120. For example, banks can authorize currency distribution electronically, which may then form the basis for allocation in opportunistic-type or combination-type trades. In another example, the electronic currency resources provide access to computer currency—including, but not limited to, cryptocurrencies such as Bitcoin and Ether.

In an example of the present implementation, the grant of access to bank information uses authentication information including one or more of a password-based authentication, a cookie-based authentication, a two-factor authentication, a voice-verification authentication, a fingerprint authentication, a public key-private key authentication, or other authentication method that is available to the network architecture. For example, in an application installed on a desktop, a user can provide a two-factor authentication, while on a mobile device including a fingerprint scanner, the application is available to authenticate fingerprint signatures, where, upon authentication, the bank account information is available to a third party application. Alternatively, a predetermined authentication is provided via a user's device 115A to a bank 120C, via direct communication 125, which then allows for the computerized exchange 105 to directly secure the bank information from the bank—using an application program interface (API) module, for instance.

In an exemplary embodiment, the instruction received from one of the client devices 115A-D is to execute opportunistic-type trades or combination-type trades using a currency value. One or more processors of the computerized exchange 105 executing the one or more computer-readable code functions causes the computerized exchange 105 to communicate with the electronic currency sources 120A, 120B, and 120C using bank access information to secure the currency value for use in the opportunistic or combination-type trade. The computer-readable code functions executed on the one or more processors of the computerized exchange 105 configures the one or more processors to execute the opportunistic-type or combination-type trades in accordance with the received user instruction.

The opportunistic-type or combination-type trades use part or all of the currency value provided during the bank access to iteratively secure currency positions from one or more computerized exchanges 130 and 135 that are different than the computerized exchange 105. In an exemplary embodiment, the one or more computerized exchanges 130 and 135 are currency exchanges that are located remote from the currency exchange 105 registered with the client devices 115. Each of the iteratively secured currency positions is verified as a positive variation of one or more of the performance data. For example, the opportunistic-type trades can include currency trades with currencies having variations of up to +/−1.30% on a daily basis. Similarly, in another example, the non-opportunistic type trades can include currency trades with currencies having variations of less than +/−0.05% on a daily basis. The one or more processors executing the one or more of the plurality of computer-readable code functions also causes the computerized exchange 105 to update the currency value after the opportunistic-type or combination-type trades are executed and to transmit for display to the client devices 115, the updated currency value and a projected gain value calculated from the positive variation of each iteratively secured currency position. In an alternate embodiment, network 110A connects directly with computerized exchange 130 and/or computerized exchange 135.

FIGS. 2 and 3 illustrate a flow chart of exemplary methods 200 and 300 for a computerized exchange in a network with electronic currency sources and client devices, in accordance with various embodiments. In an exemplary implementation, the exemplary methods 200 and 300 are implemented in the system 100 of FIG. 1, wherein the processor in the computerized exchange 105 performs the steps in the exemplary methods 200 and 300.

In an implementation, by way of an example, methods 200 and 300 for implementation on a computerized exchange 105 in a network, such as network 100 of FIG. 1, are provided. The network 100 includes at least one electronic currency source 120 and a plurality of client devices 115. A storage medium of the computerized exchange 105 for storing a plurality of computer-readable code is provided. In an example, each function of the exemplary methods 200 and 300, including functions 205, 210, 305, 310, and 315, are independent modules of computer-readable code. In another example, each of the functions so identified configures the one or more processors, together or independently, to perform methods 200 and 300, or portions thereof.

In an exemplary implementation, methods 200 and 300 configure the one or more processors for executing one or more of the plurality of computer-readable code. The execution of the computer-readable code configures the one or more processors to perform the corresponding functions. For example, the one or more processors are configured for causing the computerized exchange 105 to receive data and instructions from one of the plurality of client devices in accordance with step 205. In step 205, filtering of the data and instructions received at the computerized exchange 105 using metadata or data patterns is initiated. The use of metadata or data patterns in the filtering process allows the computerized exchange 105 to identify the aforementioned performance data, the client data, and the instruction.

As described with respect to the system of FIG. 1, the performance data includes one or more of an average currency balance, average interest rate, average spread, and total interest rate. The performance data is incorporated in a new analysis process, where real-time or historical average currency balances, average interest rates, average spread and total interest rate is applied to present currency values using a statistical best fit process to determine the relevance to the present currency values. The client data corresponds to bank access information for an electronic bank account and to currency value corresponding to the electronic bank account. The instruction is for executing opportunistic-type trades or combination-type trades using the currency value.

The one or more processors executing the one or more of the plurality of computer-readable code functions causes, according to step 210, the first computerized exchange to perform various functions as described below by configuring the one or more processors of the computerized exchange 105. For example, in accordance with step 305, the one or more processors executing the one or more of the plurality of computer-readable code functions is configured to communicate with the at least one electronic currency source using the bank access information to secure the currency value for use in the opportunistic-type trades or combination-type trades. The one or more processors, as configured, also execute the opportunistic-type or combination-type trades in accordance with the received instruction according to step 310.

In method step 310, the opportunistic-type or combination-type trades use part or all of the currency value to iteratively secure currency positions from one or more second computerized exchanges 130-135, in the network 100. Each of the iteratively secured currency positions is verified as a positive variation of one or more of the performance data. The one or more processors executing the one or more of the computer-readable code functions also causes the computerized exchange 105 to update in step 315 the currency value after the opportunistic-type or combination-type trades are executed. Further the one or more processors are configured, via the same method step 315, to transmit for display to one of the plurality of client devices the updated currency value and a projected gain value calculated from the positive variation of each of the iteratively secured currency positions. The client devices 115 are configured to display the updated currency values and the projected gain value, as received. Block 320 concludes the present method 200-300 for the computerized exchange 105 in the network 100 with the electronic currency sources 120 and the client devices 115, in accordance with various embodiments.

Figure 4:
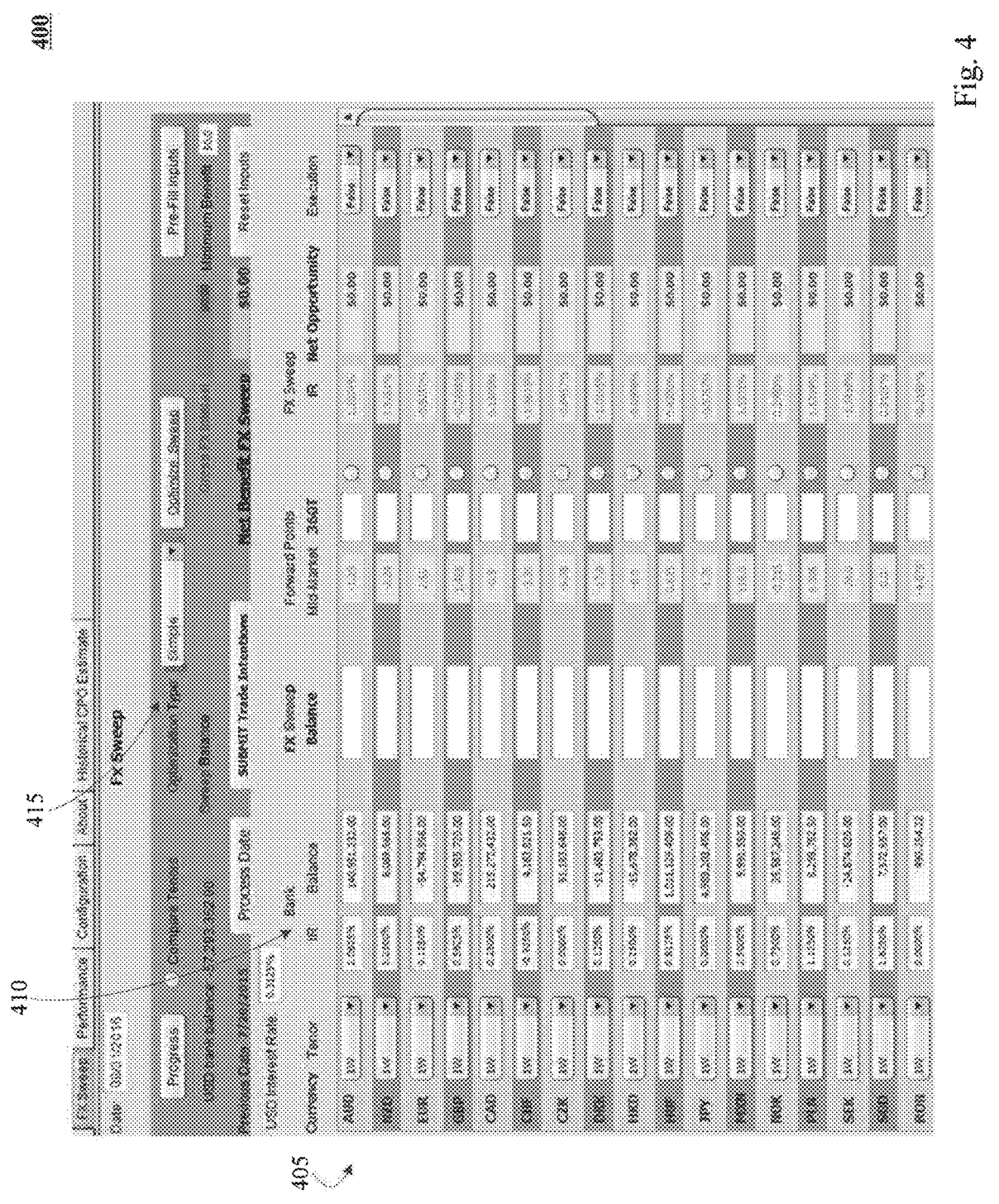

FIG. 4 illustrates an example interface, using the example methods of FIGS. 2 and 3, for currency pool trading in a computerized exchange system, such as the system of FIG. 1. The example interface of FIG. 4 may also rely on an application program interface (API) for obtaining and providing information for currency pool trading in the computerized exchange. In an exemplary implementation, each of the plurality of computer-readable code is an API. In FIG. 4, an interface API provides the display aspects of the methods 200-300 of FIGS. 2-3. Pertinently, interface 400 displays the updated currency value and the projected gain value as a result of a sweep balance instruction for optimization 415 from the interface 400. In another implementation, each of the computer-readable code includes sub-modules of computer-readable code that are designated to perform part of a function assigned to their corresponding computer-readable code.

Further, in another example, each of the computer-readable code is configured to encrypt communications between the computerized exchange 105 and any of the electronic currency sources 120, the plurality of client devices 115, and the one or more second computerized exchanges 130-135. In yet another example, the electronic currency sources 120 are illustrated as providing balance values 410 for trading via the computerized exchange 105. The present method, in an example, allows each of the client devices 115 to execute an application for communicating with the computerized exchange 105 via its own client processor.

In another example, the computerized exchange 105 transfers the currency value from the electronic bank account, as described above, to the first computerized exchange 105 prior to executing the opportunistic-type or combination-type trades. For example, the currency values are noted in the bank balance 415 in the interface 400. The currency values are typically updated continuously or after each scheduled sweep of the balance. The present method for implementing monetary exchanges include features where the combination-type trades extend to currency trades with currency classified as available for the opportunistic-type trades and also available for non-opportunistic type trades. Moreover, in certain implementations, the combination-type trades can include currency trades where the currency value remains the same after each iteratively secured currency position. The present methods 200-300 also incorporate features allowing the combination-type trades to include currency trades where the currency value is flattened or closed after one or more of each iteratively secured currency position. For example, an outstanding instruction from the client devices 115 to the API implemented on the computerized exchange 105 allows the computerized exchange 105 to flatten or close a currency position after each secured currency position, thereby rendering the balances for currency trading to zero.

In other exemplary implementations, the currency value is available for transfer to a different unit of currency prior to executing the opportunistic-type or combination-type trades. In the interface 400, the various currency offerings are listed at 405 and a transfer of unit is available and recognized in the present methods 200-300, which then transacts in the currency unit selected. Furthermore, the currency value may be in a different unit of currency in each iteratively secured currency position. For example, as illustrated in the interface 400, the present methods 200-300 is agnostic to the currency unit and is capable to transact in any unit for each interaction. Of particular importance, however, is to secure the performance data, the client data, and the instruction to execute a trade type as described with respect to FIGS. 1-3, above. Optionally, each of the one or more second computerized exchanges is also designated to transact in the same or a different unit of currency.

The implementation of FIG. 4, also corresponds to an exemplary implementation of an interface for a software application that may be either on a fixed or mobile client device, and which enables users to enhance their currency pooling facility provided by a bank. Furthermore, the banks can support the electronic currency sources described with respect to the implementations of FIGS. 1-3. The client devices may belong to individuals or corporate group users. The present implementations efficiently allocate currency balances resulting in higher net earned-interest income by up to 75%. The software application of FIG. 4 is configured to calculate total benefit of running the currency pool optimization over a historical period as well—instead of using current currency values. In an example, sharing of client data allows client devices 115 to share data so that one client's historical data—either manually or automatically contributed, then approximates a value for average balance and either average interest-rate, average spread to benchmark rate (e.g. LIBOR spread), or total interest received in each respective currency. This information is then available as performance data for future trading.

The implementation of FIG. 4 may proceed using a standard installation of a client module of the present software in a client device. Integration is allowed or authorized with an accounting system, general ledger, and electronic trading platform. User performances, user tolerances and thresholds, as well as database locations for reporting files, are then set for the present software. Thereafter, if the present software is authorized to communicate with banks that are authorized by the client device, then the present software can secure currency values for trading from their authorized banks. Alternatively, banks supported via electronic currency sources provide a similar architecture for actual funds to be used in the currency trading process for the client device. After installation, when the client device initiates the software application, a process for performing cash management is initiated. Relevant data is loaded and optimization begins such that the software application then communicates with the computerized exchange to provide the client data for currency authorization and the instructions for trading. Trade details are uploaded to an electronic-trading platform and the user trades are processed in accordance with the instructions. After a trade executes and the process is complete, an end-of-day instruction then uploads confirmed traded data and computes expected gains (economic benefit) relative to taking no action on the existing currency levels prior to the trade.

The implementation of FIG. 4 also includes features for evaluation of performance locally, where the software application includes functionality to upload trade data, bank data, and a client's balances data to the computerized exchange, and to then calculate realized economic benefit, locally or via the computerized exchange. The performance is a comparison of what valuation remains with the client if no action was taken on existing currency versus the applied action. The difference between implementing trades and not doing anything, in aggregate and across each currency with further transparency to monthly basis, is part of the performance evaluation.

In an exemplary implementation, optimization of currency positions allows for base currency neutral, and flat base currency balance at the end of the day. These features allow for risk mitigation ahead of major decisions which tend to affect currency markets—including, for e.g., central bank policy decisions. In a general implementation, all opportunistic currency trades are included; in a neutral base implementation, however, combination (including non-opportunistic and partial amounts) trades are implemented, resulting in no change of initial total base currency balance; and, finally, in the flat base combination implementation (including non-opportunistic and partial amounts) the base currency is flattened or zeroed out of the initial total base currency balance—ensuring that all currency available for trading is traded.

In another embodiment, a tenor survey feature is available, wherein the present system and software is available to compute and display optimal period for currency balance placement to achieve maximum interest rate. Furthermore, it is recognizable that optimization, by replacing a base currency with either bank biased currency or market biased currency is available herein to improve the performance of the computer to recognize the trading content—e.g., using Japanese Yen instead of current base currency of U.S. Dollars for trading, if such a process is recognized by the system as economically more beneficial based on the performance data. In certain examples, review processes are available within the present software to increase gains via different crosses of currency—e.g., Euro or Pound and Australian or Canadian Dollar, instead of Euro and U.S. Dollar or Pound and U.S. Dollar, among other non-limiting combinations. Moreover, the present software is capable of including monitoring or diagnostic functions to report on quality of execution by a client device and the related entities. For example, the present software may be configured to determine how much money is left in balances, or the fees paid or due via pricing spreads paid to each liquidity provider.

Figure 5:
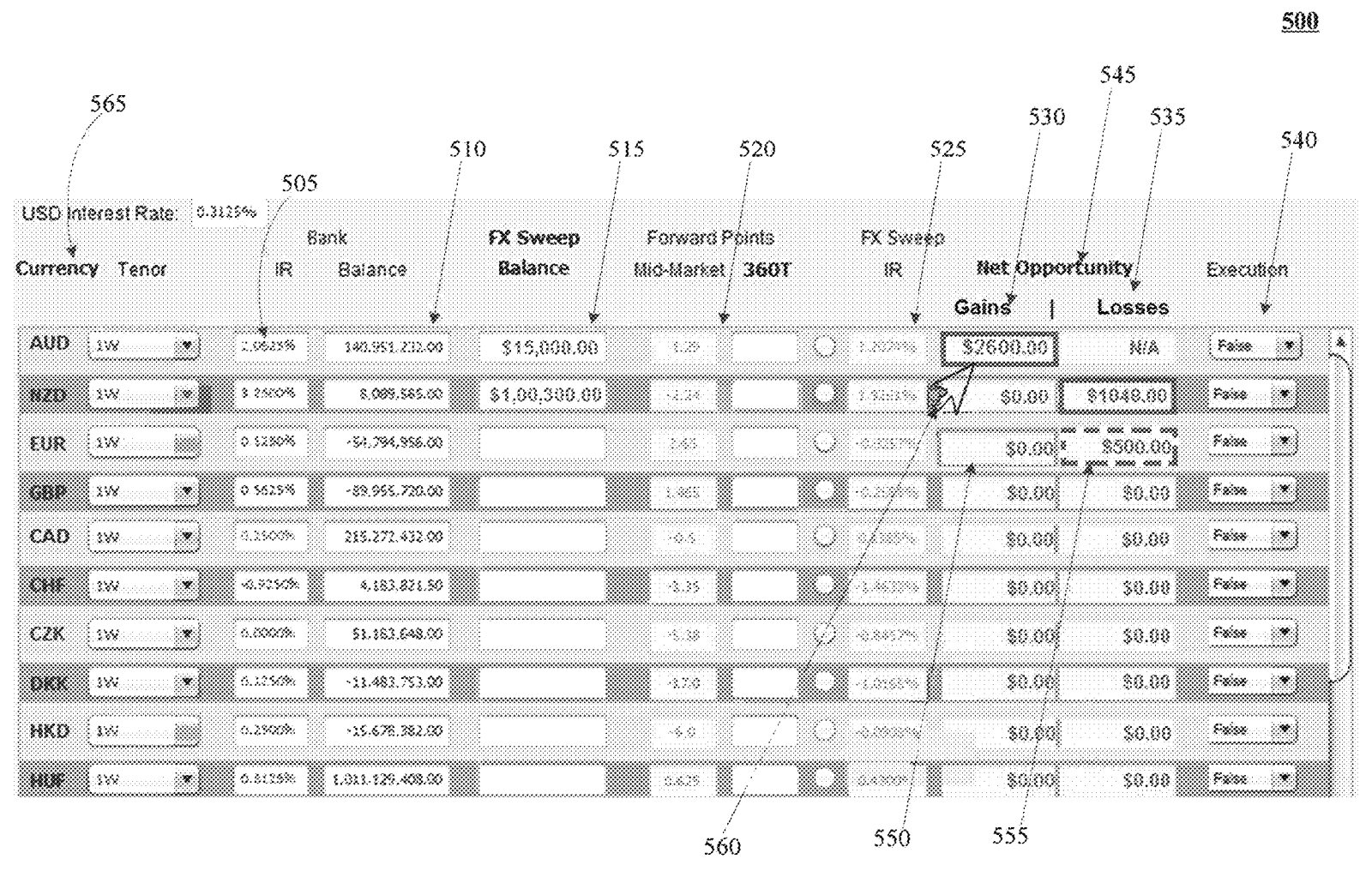

FIG. 5 is another example interface utilizing an API for currency pool trading on a computerized exchange system, such as the system of FIG. 1. Initially, the values represented in the figure are exemplary and not taken to imply any accuracy with respect to the mathematical interactions between the columns. The graphical user interface (GUI) 500 of FIG. 5 is designed to prevent errors in a dynamic environment such as a computerized currency trading environment of the present disclosure. In a dynamic environment, calculated net opportunity is provided as real time gain and loss values for multiple currency balances 515. The gain and loss values 530/535 are subject to real time changes. As a result, any latency or delays, by the computing device hosting the interface 500, the network, or the computerized exchange (see FIG. 1), causes a delay in selecting to transact at a specified interest rate. Such a delay causes large errors in the intended net opportunity values 545. Accordingly, GUI 500 facilitates currency trading in an electronic exchange using a dynamic interface that provides real time gain and loss values and facilitates the execution of intended trades at the projected gain opportunity costs, while setting aside marked losses.

In an example, a method implementing the GUI 500 dynamically displays values 505 for one or more bank interest rates (Bank IRs) for different currencies 565. The Bank IRs 505 may pertain to real time interest rates from one or more banks holding the currency balances for currency pooling. Alternatively, the Bank IRs represent the real time interest rates for the current balances from any currency source. The FX Sweep Balance 515 represents the currency values that are authorized for transacting in the currency pool. The Forward Points Mid-Market rate 520 represents third party sourced rates that may or may not include additional basis points on top of a calculated ratio of bid and offer values for exchange of a currency from a base currency type to an intended currency type. Alternatively, the Forward Points Mid-Market 520 represents currency market interest rate differences between the currency types. When an implied interest rate is better for a different currency type than the base currency type, it may be economically beneficial to transfer the base currency type to the different currency type to take advantage of the interest rate. Further, such economic benefits take into consideration any exchange rate requirements to maintain the benefit. The FX Sweep interest rate 525 represents the implied interest rate for each currency. The implied interest rate for each currency, in an example, is a difference of a corresponding value Forward Points Mid-Market rate 520 for that currency and its spot value.

The Net Opportunity 545 represents dynamically calculated gains or losses as the implied interest rates 525 change, along with real-time changes in the Bank IRs 505 and real-time changes in the Forward Points Mid-Market rate 520. Accordingly, GUI 500 illustrates first values in the gains column 530, which represents dynamically displayed indications in specific regions of the GUI 500. The GUI 500 also illustrates second values in the losses columns 535, which also corresponds to dynamically displayed indications in specific regions of the GUI 500. Pertinently, the rows of the gains column 530 represent locations in the GUI for gains, while the rows in the losses column 535 represent locations in the GUI 500 for losses. These regions are dynamic and selectable.

In an example, each location (each row) in the gains column 530 provides a dynamic value indicating a gain based on a comparison of the FX Sweep Balance (from column 515), at a bank interest rate in its base currency, versus the FX Sweep Balance at the implied interest rate from the FX sweep IR column 525. The dynamic values of the gains column 530, therefore, are indicators representing the present, but dynamic, gain for the balance available for transacting (FX Sweep balance 515). A selection, via an input tool 560, of a row from the gain column 530 is associated with at least one recorded order, in the computerized trading system, to transact the associated currency at the authorized balance for savings in the transacted currency rather than the base currency, for instance. The input tool is illustrated as a pointer controlled by a user of the GUI 500. The selection of row 1 of column 530, for $2600.00, initiates an order to transact the corresponding authorized balance of the FX sweep balance 515 (i.e., $15,000) at the interest rate reflected in the corresponding row of the Forward Points Mid-Market rate 520 (i.e., 1.29%). Dynamically, however, if the value in the selected row suddenly changes to a loss value, because of a change in a corresponding Bank IR value or the Forward Points Mid-Market rate, then a calculated gain reflected in the Gains column 530 does not exist and the area is not selectable. Instead, the corresponding row of the losses column 535 is updated at column entry 555 to reflect a calculated loss value—reflected by dotted box. The removal of the row entry from the gains column and entry of a loss value in the loss column provides a dynamic interface for preventing errors in foreign exchange trading for currency pools.

The loss column entry 555 reflects a dynamic display of a second value in a column of second values. The different locations of the second values (in the losses column 535), compared to the first values (in the gain column 530), are also selectable areas in the GUI 500. Unlike the first areas which allow selection to initiate an order for transactions, selecting from one of the areas in the losses column 535 may be required to acknowledge that a gain value has changed to a loss value. This process and feature of the GUI 500 prevents a user from erroneously selecting a value that may have already changed to a loss value due to latencies in the system. Latencies in the system may cause the changes in interest rates to be reflected at a later time—after the order for transaction has been executed. Accordingly, the dynamic GUI 500 helps prevent orders from being improperly transacted.

The GUI 500 also displays the gains and the losses regions or columns 530/535 in relation to the authorized transaction balance of the FX Sweep Balance 515 and the real time interest rate values from the Bank IR 505 and the FX Sweep IR 525. The values in either the gain column or the loss column 530/535, therefore, are not static and move horizontally (in the row direction) depending on the competing interest rates 505/525. The competing interest rates 505/525 and the balances are static areas that do not change. In response to a selection of specific locations of the loss or gain columns, by actions of the user input, parameters are provided to the computerized trading system to transact an order relating to the authorized balance in the corresponding row of the FX Sweep Balance 515. The order may be sent for execution to the appropriate systems capable of implementing the order.

The various implementations above are applicable in many different and varied operating environments, including on one or more electronic devices that incorporate integrated circuits or chips for processing and memory purposes. The proper configuration of hardware, software, and/or firmware is presently disclosed above to improve a computer's ability to interface with currency data. A system or method of the present disclosure also includes a number of the above exemplary systems working together to perform the same function disclosed herein.

Most of the exemplary implementations above utilize at least one communications network using one or more commercial protocols, such as TCP/IP, FTP, UPnP, NFS, and CIFS. The networks 110A-B can be wireless or wired—including a local area network (LAN), a wide-area network (WAN), a virtual private network, the interne, an intranet, an extranet, a public switched telephone network, an infrared network, a wireless network and one or more of the above networks in a combination.

The present invention includes at least a database formed from a variety of data stores and other memory or storage media. These components can reside in one or more of the servers, as discussed above, or may reside in a network of the servers. In certain embodiments, the information may reside in a storage-area network (SAN). Similarly, files for performing the functions attributed to the computers, servers or other network devices may be stored locally and/or remotely, as appropriate. Computing systems of the present disclosure, including the client devices, may incorporate hardware elements that are electrically coupled via data/control/and power buses. For example, the one or more processors may be central processing units (CPU) for one or more of the client devices. The client devices may further include at least one input device (e.g., a mouse, keyboard, controller, keypad, or touch-sensitive display) and at least one output device (e.g., a display, a printer or a speaker). Such client devices may also include one or more storage devices, including disk drives, optical storage devices and solid-state storage devices such as a random access memory (RAM) or read-only memory (ROM), as well as removable media devices, memory cards, flash cards, etc.

In another embodiment, processing capabilities for multiple currency pooling facilitators are used instead of one. Selectable optimizations to the invention include the use of a base neutral, an account neutral and processing across all possible portfolio component combinations. Multiple facilitators require additional data feeds (from each facilitator) which increases the need for proper data network trafficking, processing and analysis. The number of facilitators linearly multiples processing cycles, however, with diminishing incremental gains. A base neutral reduces risks for the users by mitigating the impact of potential changes in base currency interest rates (e.g., central bank hikes, market driven interest rate moves, or shifting of overall client net-balances of a facilitator resulting in interest rate adjustments). Analysis initiates actions which would, independently, result in adverse outcomes, however, when pooled with other actions, results in a greater aggregate efficiency levels while mitigating risks from base currency. An account neutral is similar to Base Neutral but takes into account additional data and account information to neutralize the potential effective of base currency interest rate movements on the user's overall exposures—not just the currency pooling components. Evaluating all portfolio components may exponentially increase the degree of complexity of calculations as optimizations are run against all portfolio components instead of just the base currency, i.e., every component currency becomes a proxy base currency in order to ultimately determine the greatest efficiency combinations. Real-time market data results in increases by an exponential factor (e.g. for a pool of 10 currencies, only (10*number of tenors*sources*pricing factors) of market data (MD) were required, while now the requirement is [MD] ^9 to account for all different combinations of currency pairs). All other processes/calculations are increased by the same exponential factor. In short, networking and data volume increases, the need for real-time processing increases, and a greater mitigation of risks while improving efficiency is achieved.

The devices in the present disclosure can also include computer-readable storage media readers, communications devices (e.g., modems, network cards (wireless or wired), or infrared communication devices) and memory, as previously described. The computer-readable storage media reader is connectable or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and, optionally, which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for displaying net opportunity values to facilitate currency pool trading on a graphical user interface, the method comprising:
    dynamically displaying first values in a plurality of clickable first locations of a gain display region, each clickable first location corresponding to a location of a respective gain value for one of a plurality of available currency balances in different currencies, the plurality of clickable first locations associated with orders to transact corresponding available currency balances at a respective displayed implied interest rate;
    dynamically displaying second values in a plurality of clickable second locations of a loss display region, each clickable second location corresponding to a location of a respective loss value for one of the plurality of available currency balances;
    dynamically changing at least one of the first values in one of the plurality of clickable first locations to at least one of the second values in the plurality of clickable second locations, in response to a changed implied interest rate for the at least one of the first values; and
    in response to a selection of one of the plurality of clickable first locations or the plurality of clickable second locations, by single action of a user input device, initiating a trading record for a trade order associated with the selection.

2. The method of claim 1 wherein the step of initiating a trading record is in response to a selection of one of the plurality of clickable first locations.

3. The method of claim 1 wherein the step of initiating a trading record is in response to a selection of one of the plurality of clickable second locations.

* * * * *